United States Patent [19]

Sartori

[11] Patent Number: 5,056,971
[45] Date of Patent: Oct. 15, 1991

[54] OPERATING HEAD CHUCK UNIT FOR AUTOMATIC MACHINE TOOLS

[75] Inventor: Marco Sartori, Piacenza, Italy

[73] Assignee: JOBS S.p.A., Piacenza, Italy

[21] Appl. No.: 429,829

[22] Filed: Oct. 31, 1989

[30] Foreign Application Priority Data

Oct. 21, 1988 [IT] Italy .................. 44812 A/88

[51] Int. Cl.⁵ .............................. B23C 1/12
[52] U.S. Cl. ........................ 409/201; 409/211; 409/216; 409/231
[58] Field of Search ............... 409/231, 232, 233, 234, 409/201, 216, 211; 408/239, 239 A, 240

[56] References Cited

U.S. PATENT DOCUMENTS

| 4,008,647 | 2/1977 | Hague et al. | 409/231 X |
| 4,449,866 | 5/1984 | Lohneis et al. | 409/231 X |
| 4,759,115 | 7/1988 | Kielma | 409/233 X |

FOREIGN PATENT DOCUMENTS 4480488 9/1989 Italy .

OTHER PUBLICATIONS

Euchner-Inductive Proximity Switches, published before 10/21/88.
Interruttion Di Prossimiter Compatti, published before 10/21/88.

Primary Examiner—Z. R. Bilinsky
Attorney, Agent, or Firm—Notaro & Michalos

[57] ABSTRACT

The invention relates to the chuck unit of an operating head for automatic machine tools in which the operating head is the type comprising a fork, fitted to the end of a mobile arm and equipped with a number of degrees of freedom, to which the chuck unit is hinged; the chuck unit comprises a chuck and equipment designed to rotate the chuck so that it slides axially.

The unit in accordance with the invention is designed for use with a brushless motor and automatic equipment which varies the velocity ratio between the said motor and the chuck.

9 Claims, 4 Drawing Sheets

OPERATING HEAD CHUCK UNIT FOR AUTOMATIC MACHINE TOOLS

FIELD AND BACKGROUND OF THE INVENTION

This invention relates to a tool drive unit or chuck unit for the operating heads of automatic machine tools, designed to machine at variable speed with constant torque. This characteristic means that high torque can be transmitted to the tool at a low rpm, thus making the machine ideal for machining materials such as titanium.

Automatic machine tools are known which comprise an operting head consisting of a fork fitted at the end of a mobile arm according to a number of axes, to which a chuck unit comprising a chuck and the equipment designed to rotate it are hinged.

Italian patent application 44804 A/88 describes an operating head of this type, which includes equipment designed to control limited movements of the chuck along its own axis as it rotates.

This system presents some limitations, however, in particular when titanium parts need to be machined, as this metal requires a low tool speed.

Known apparatus can only transmit sufficient power to the tool when it rotates at a high rpm.

For this reason there is a need for apparatus which enables constant torque to be transmitted to the chuck at any rpm.

This apparatus should preferably enable a number of speed ratios to be used, though without loss of precision, while maintaining the compactness achieved in current similar, more highly perfected types of apparatus.

SUMMARY OF THE INVENTION

In order to solve this problem, this invention proposes an operating head chuck unit for automatic machine tools in which a brushless motor connected to the chuck via a multi-ratio drive is used to drive the chuck.

Suitable transducers are fitted which automatically control and regulate the position of the various components of the drive unit so that the speed ratio is automatically changed with no need for manual intervention.

BRIEF DESCRIPTION OF THE DRAWINGS

The invention will now be described in detail, by way of example but not of limitation, by reference to the annexed figures in which.

DESCRIPTION OF THE PREFERRED EMBODIMENT

Figure 2:
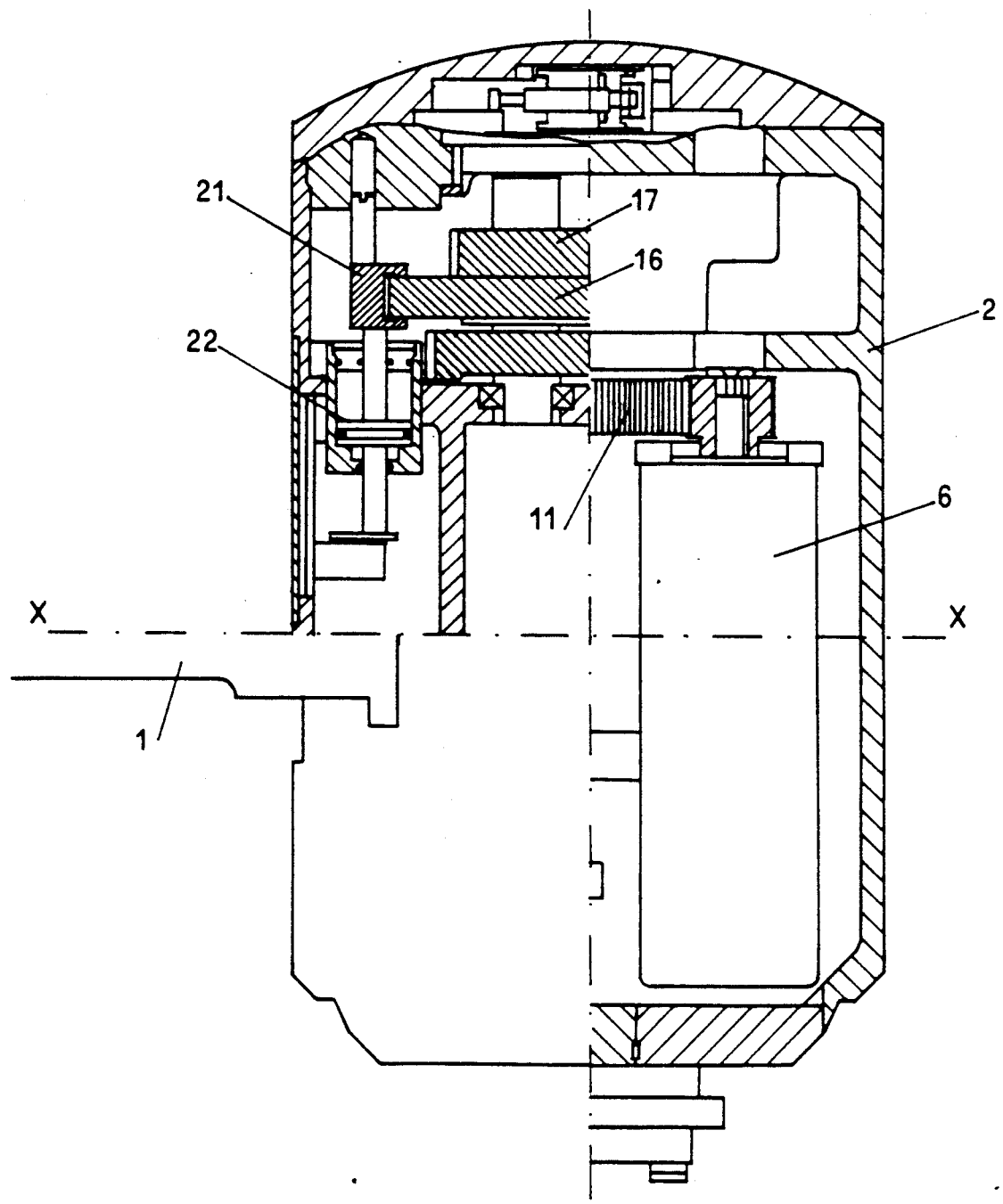
FIG. 2 is a cross-section along line A—A of FIG. 1.

As mentioned, the tool-holder unit is fitted to a fork so that it rotates around an axis indicated X—X in FIG. 2.

The same figure shows one of the supports 1 which allow the assembly to be fitted onto the support fork which provides one degree of freedom.

Figure 3:
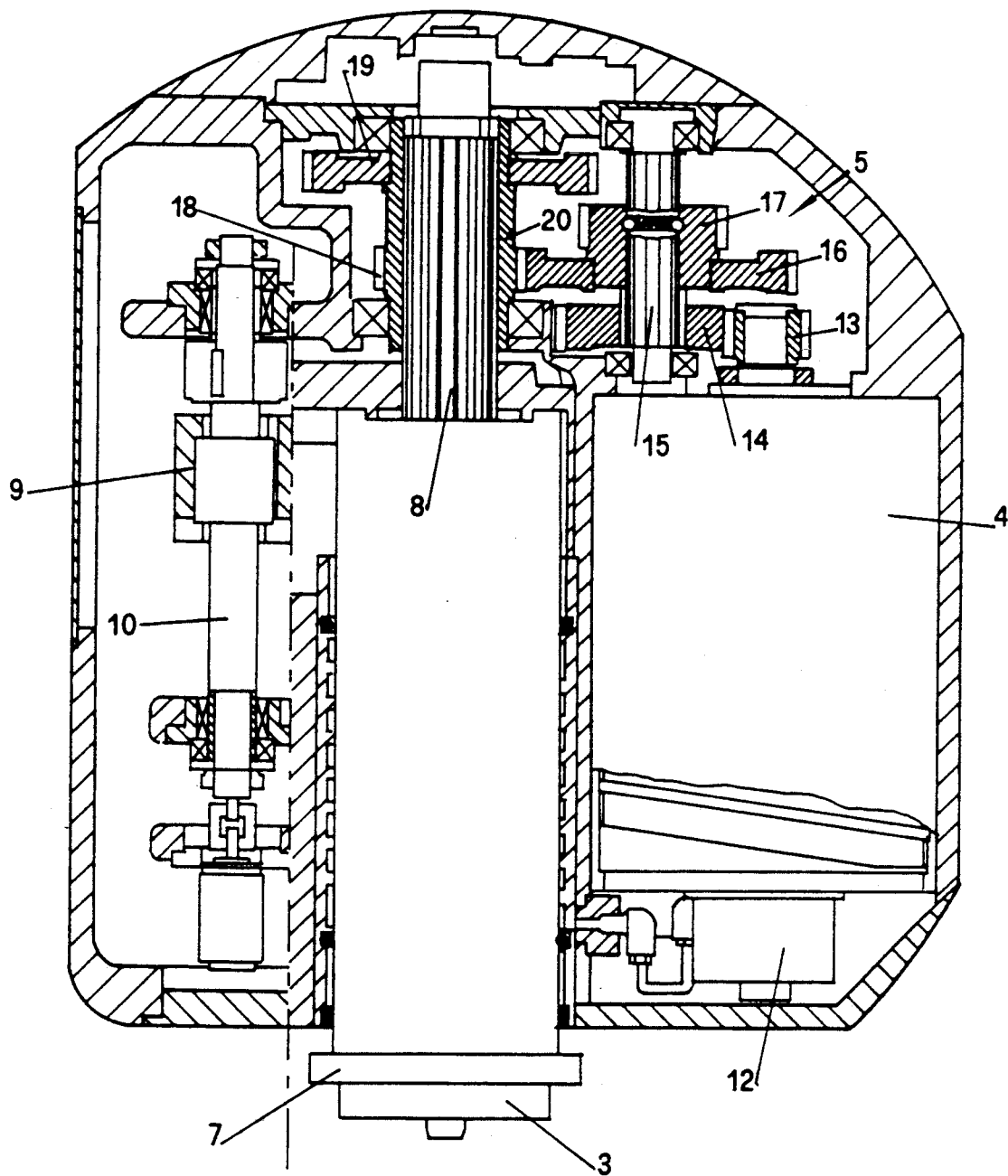
FIG. 3 is a cross-section along line C—C of FIG. 1.

As shown in FIGS. 2 and 3, the drive unit in accordance with the invention comprises a chuck 3, a motor 4 which rotates the chuck via a drive unit assembly generally designated 5, and a motor 6 which controls the axial movements or translation of the chuck, all fitted to a support or box frame 2 which is of the type having a plurality of degrees of freedom.

The chuck is fitted in a bushing 7 so that it can rotate, and is integral with a first splined shaft 8 which is designed to slide inside a sleeve 20, grooved on the interior and mounted on bearings.

Bushing 7 is integral with a spiral slider 9 which is fitted on a recirculating roller screw 10, rotated around its own axis by motor 6 via a timing belt 11 the like.

Figure 1:
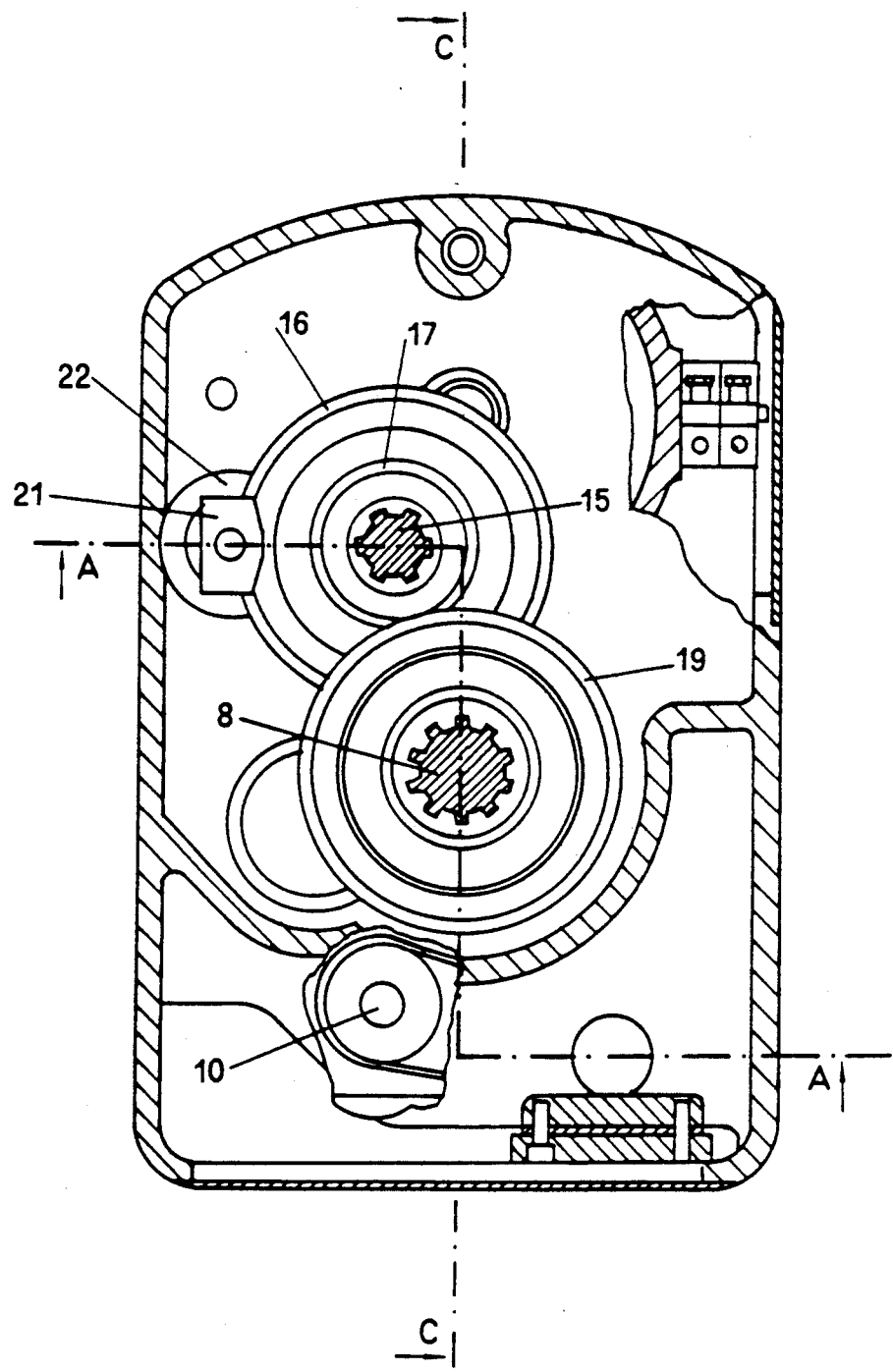
FIG. 1 is a cross-section of a chuck unit in accordance with the invention.

As evident from FIG. 1, the chuck drive motor would be on one side of the bushing, the position of the bushing being around the shaft 8 and the position of the chuck drive motor being above the shaft 8, while the motor 6 for turning the roller screw 10, is on an opposite side of the bushing, in the vicinity of the screw 10 as shown in FIG. 1.

Motor 6 can be used to rotate screw 10, making slider 9 slide and thus causing bushing 7 to move along its own axis and chuck 3 and splined shaft 8 to move with it.

Chuck drive motor 4 is the brushless type controlled by a resolver 12 of known type.

A pinion 13 which engages with a cogwheel 14 is splined to the shaft of motor 4. The cogwheel is fixed to a splined shaft 15 which is fitted to the apparatus on bearings.

A second pair of cogwheels 16 and 17 which are integral with one another are fitted on a second splined shaft 15 and can slide along it.

Cogwheels 16 and 17 are differently dimensioned so that they engage the cogs of corresponding first wheels 18 and 19 splined onto sleeve 20 to produce different velocity ratios between the motor 4 and rotation of the shaft 8.

Cogwheel 16 is engaged by a fork 21 fitted to the rod of a pneumatic piston 22 which, via the fork, controls the movements of cogwheels 16 and 17 along splined shaft 15 thus forming velocity ratio changing means for changing the velocity ratio.

Piston 22 and fork 21 are cogwheel moving means for the invention.

Figure 4:
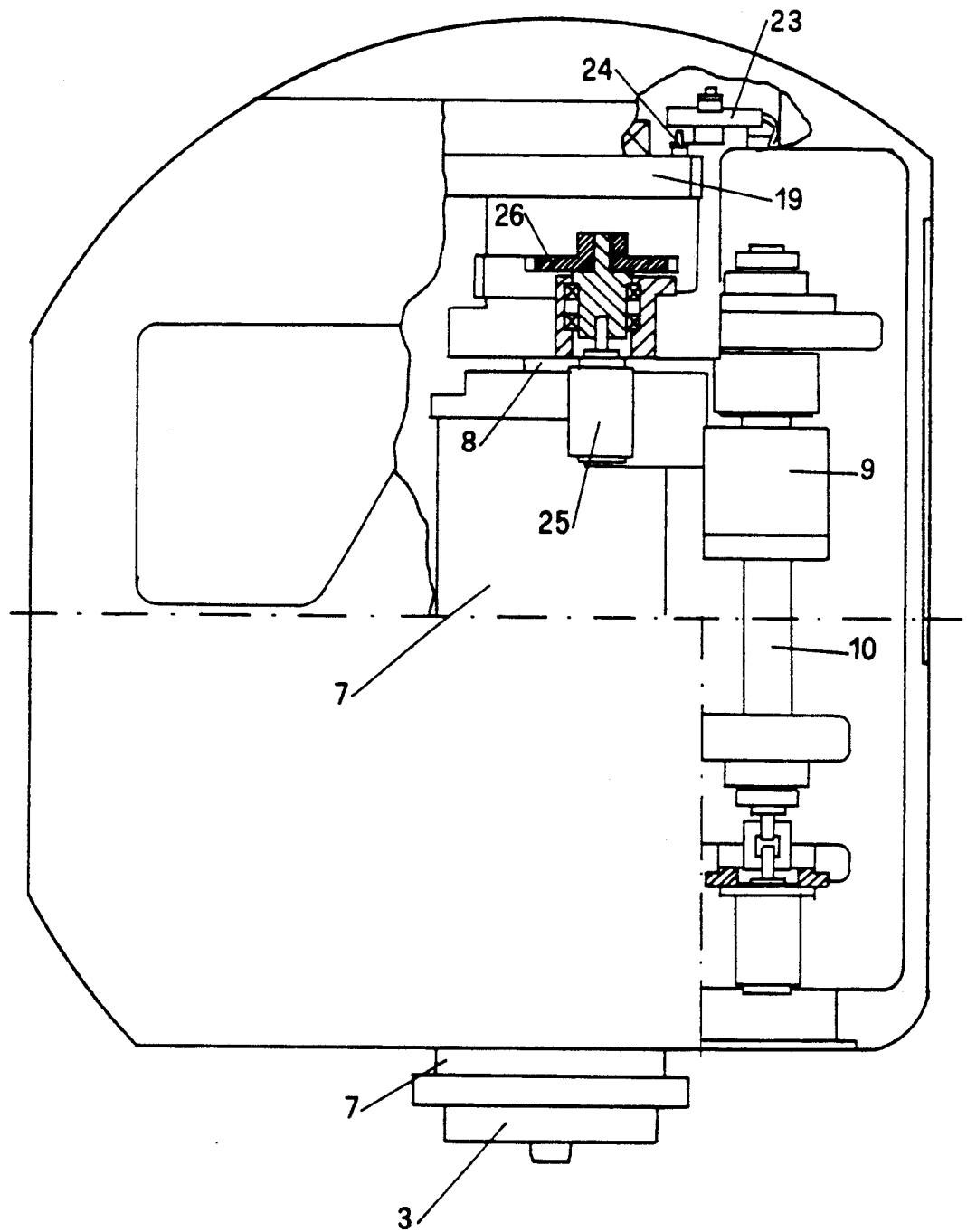
FIG. 4 is a partial cross-section of a unit in accordance with the invention viewed from the opposite side to that shown in FIG. 3.

The angular position of shaft 8 and consequently that of chuck 3 and cogwheels 18 and 19 is monitored first by a sensor 23 (FIG. 4), intercepted by a pair of pegs 24 or similar which are fitted to wheel 19, and then, with greater precision, by a resolver 25 fitted on the shaft of a gear 26 which engages the cogs of wheel 18.

All the devices described are connected to the electronic apparatus which controls the various functions of the machine.

The unit operates as follows.

When the apparatus has been prepared with the tool fitted on chuck 3, machining can be commenced by starting motor 4 via resolver 12.

By means of pinion 13 the motor rotates gear 14, and with it splined shaft 15 and wheels 16 and 17.

Assume that piston 22 is in the lowered position shown in FIG. 2.

In this case wheel 16 engages wheel 18, rotating shaft 8 and chuck 3 at top speed.

To change over to a lower rotation speed the machine must be stopped until the cogs of wheels 16, 17, 18 and 19 are timed; wheels 16 and 17 are then slid until the first disengages from wheel 18 and the second engages the cogs of wheel 19.

The apparatus in accordance with the invention does all this automatically.

The speed of motor 4 is reduced by the control devices, and when sensor 23 detects the presence of peg 14 its movement is stopped. The alignment between the cogs of the various wheels is now approximate. Resolver 25 operates to adjust it to the exact position; again via the machine control devices it controls the rotation of shaft 8 until the various gears are timed.

Piston 22 then comes into operation, moving jaw 21 upwards; the latter causes wheels 16 and 17 to run along shaft 15 until cogwheel 19 is engaged.

The machine can now resume work with the chuck rotating at a lower speed.

The alignment devices described above exactly position the chuck for automatic tool change as well as timing the cogs of the various gears.

An expert in the field could devise numerous modifications and variations, all of which should be deemed to be included in the ambit of this invention.

I claim:

1. An operating head chuck unit for an automatic machine tool, comprising:
   a fork support (1) having a fork axis (x);
   a box frame (2) defining an interior space and adapted to have a plurality of degrees of freedom, said frame having an chuck axis and being mounted for pivotal motion to said fork support, about said fork axis, said fork axis being transverse to said chuck axis;
   a bushing (7) mounted for axial movement in said frame along said chuck axis;
   a chuck (3) mounted to said bushing for rotation around said chuck axis, and movable axially with movement of said bushing;
   a first splined shaft (8) fixed to and rotationally and axially movable with said chuck, said first splined shaft extending along said chuck axis in said frame;
   a splined sleeve (20) mounted for rotation about said chuck axis and in said frame, said sleeve being splined to said first splined shaft for co-rotation of said sleeve and said first splined shaft;
   a first pair of cogwheels (18, 19) connected to said sleeve for rotation with said sleeve, said first pair of cogwheels having different dimensions from each other and being axially spaced from each other along said sleeve;
   a second splined shaft (15) mounted for rotation in said frame, parallel to said chuck axis and spaced from said first splined shaft;
   a second pair of cogwheels (14, 17) which are fixed to each other, mounted for co-rotation with and sliding movement along said second splined shaft;
   a chuck rotation motor (4) mounted in said frame, next to said bushing, said chuck rotation motor having a drive shaft extending parallel to said chuck axis and operatively connected to said second splined shaft for rotating said second splined shaft to rotate said second pair of cogwheels;
   said second pair of cogwheels having different dimensions from each other and having a first axial position on said second splined shaft for engaging one of said second pair of cogwheels with one of said first pair of cogwheels to produce a first velocity ratio between said rotation drive motor and rotation of said first splined shaft, and a second position with the other of said second pair of cogwheels engaged with the other of said first pair of cogwheels for producing a second velocity ratio between said rotation drive means and rotation of said first splined shaft;
   cogwheel moving means (21, 22) mounted in said frame and engaged with said second pair of cogwheels for axially moving said second pair of cogwheels between said first and second positions on said second splined shaft; and
   translation drive means (6, 10) mounted in said frame and connected to said bushing for moving said bushing axially along said shaft.

2. A chuck unit according to claim 1 including sensor means connected to said frame for sensing an angular position of at least one of said first and second pairs of cogwheels.

3. A chuck unit according to claim 2, wherein said sensor means comprises at least one peg connected to at least one of said first and second pair of cogwheels, and a sensor fixed to said frame for sensing passage of said peg for detecting the angular position of the at least one of said first and second pairs of cogwheels.

4. A chuck unit according to claim 2, including a resolver mechanically connected to at least one of said first and second pairs of cogwheels for rotation thereof into an exact angular position in preparation for activation of said cogwheel moving means.

5. A chuck unit according to claim 1, wherein said cogwheel moving means comprises a fork mounted to said frame for movement parallel to said second splined shaft, said fork engaged with said second pair of cogwheels and movable to move said second pair of cogwheels between said first and second positions, and a pneumatic pistion connected to said fork and mounted for movement in said frame for effecting movement of said fork.

6. A chuck unit according to claim 5 wherein said pneumatic piston is movable parallel to said chuck axis.

7. A chuck unit according to claim 1, wherein said chuck rotation motor comprises a first brushless motor, said translation drive means comprising a second brushless motor mounted in said frame, a spiral slider connected to said bushing, a recirculating roller screw mounted for rotation to said frame and engaged with said spiral slider for axial movement of said spiral slider along said roller screw with rotation of said roller screw, said second brushless motor of said translation drive means being operatively connected to said roller screw for rotating said roller screw.

8. A chuck unit according to claim 7 wherein said cogwheel moving means comprises a fork mounted to said frame for movement parallel to said second splined shaft, said fork engaged with said second pair of cogwheels and movable to move said second pair of cogwheels between said first and second positions, and a pneumatic piston connected to said fork and mounted for movement to said frame for effecting movement of said fork, said pneumatic piston being mounted for movement parallel to said chuck axis.

9. A chuck unit according to claim 8 wherein said second brushless motor (6) is mounted in said frame, next to said bushing, and an on opposite side of said bushing from said chuck rotation motor, said second brushless motor having a drive shaft extending parallel to said chuck axis.

* * * * *